Nov. 1, 1938.  T. F. PEARSON  2,134,838
SKIMMING DEVICE FOR GLASS TANKS OR FURNACES
Filed April 29, 1937  3 Sheets-Sheet 2
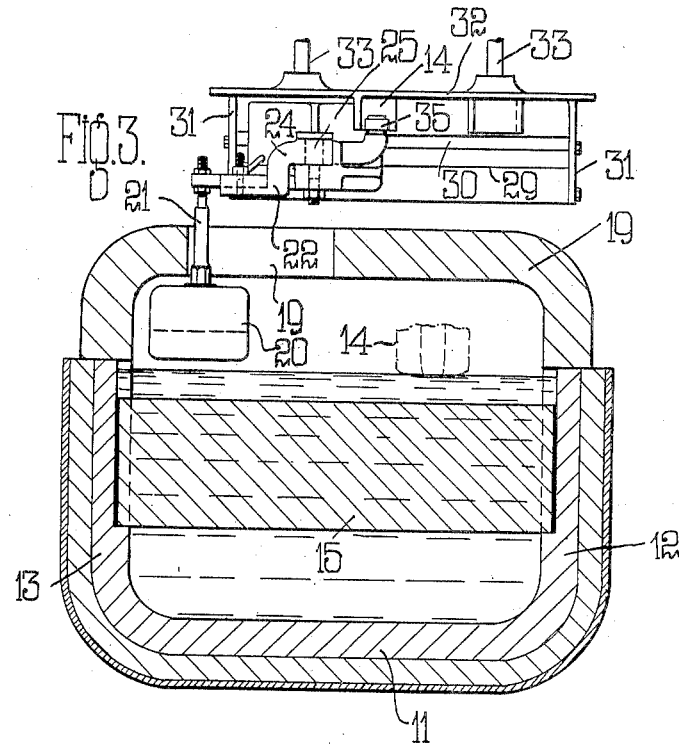
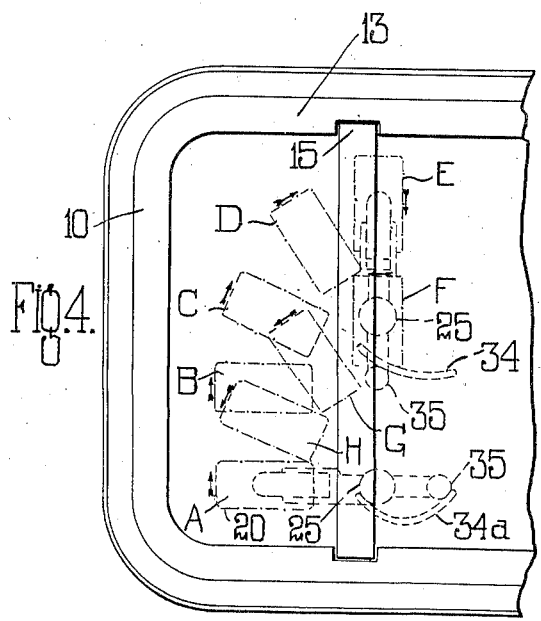
Inventor
Thomas Finney Pearson
Attorneys

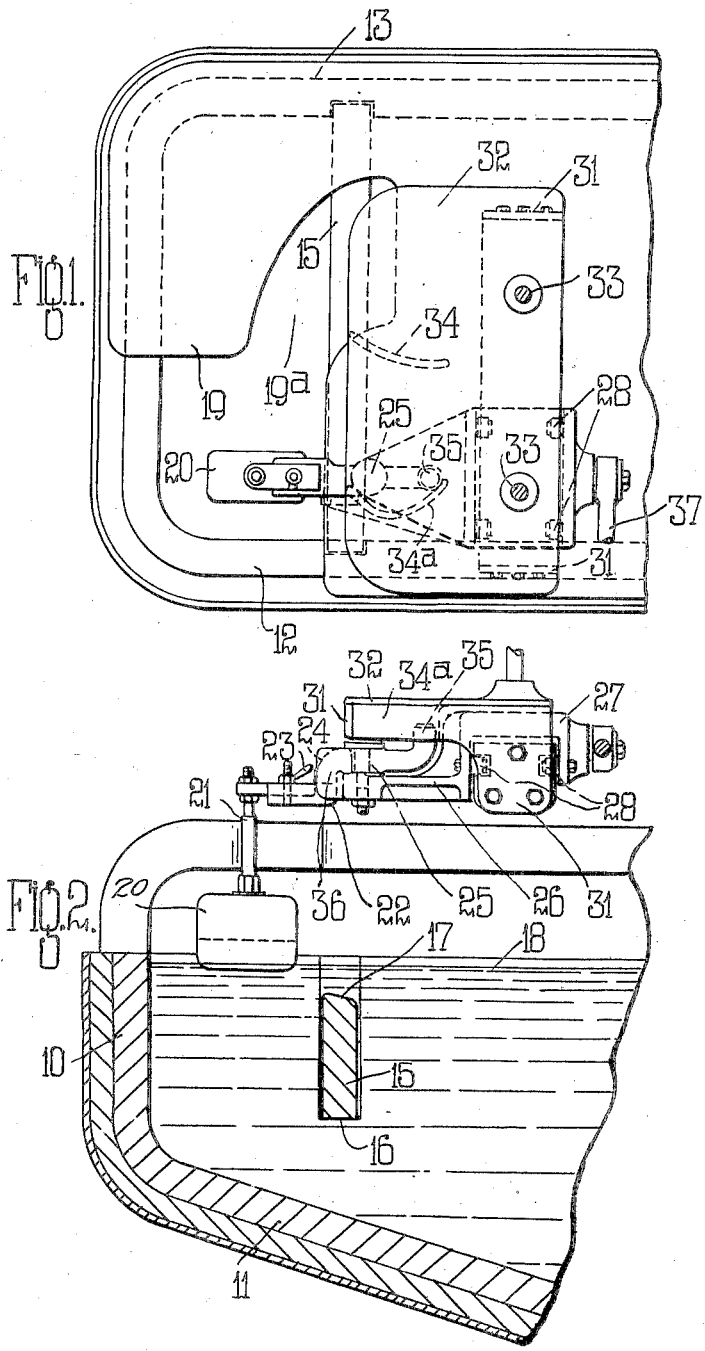

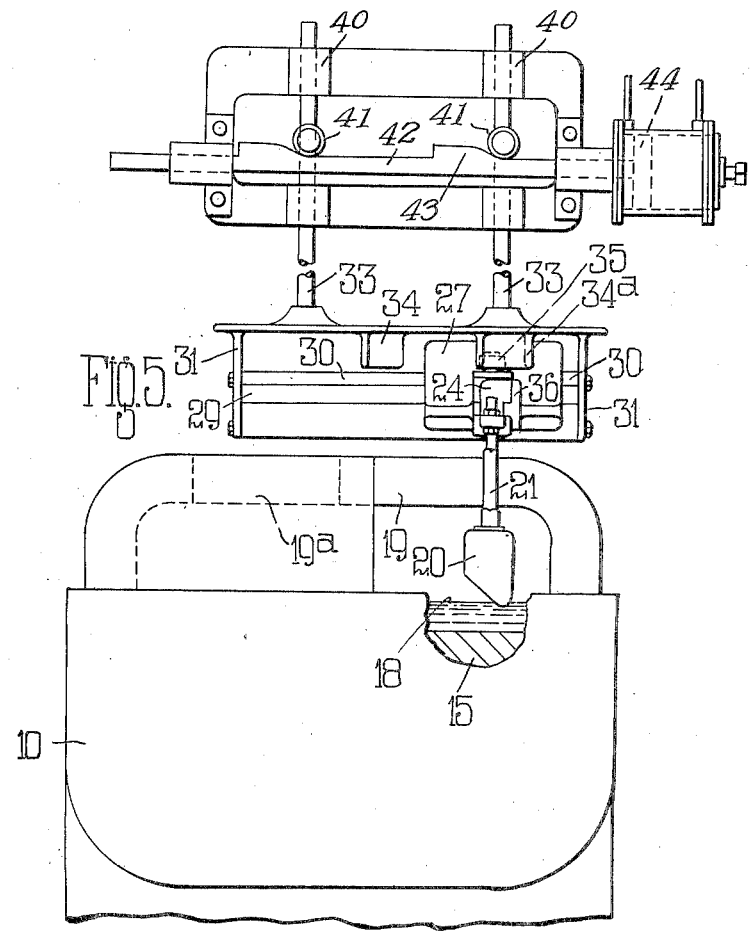

Patented Nov. 1, 1938

2,134,838

UNITED STATES PATENT OFFICE 2,134,838

SKIMMING DEVICE FOR GLASS TANKS OR FURNACES

Thomas Finney Pearson, Pontefract, England, assignor to Crown Cork & Seal Company, Inc., New York, N. Y., a corporation of New York Application April 29, 1937, Serial No. 139,805
In Great Britain May 2, 1936

8 Claims. (Cl. 49—56)

The present invention relates to skimming devices for glass tanks or furnaces and to the gathering of charges therefrom, and more particularly to the control of molten glass within the forehearth of a furnace or tank in which is located a bridge between the tank or furnace itself and the position in which charges are picked up by a gathering head or mould.

The object of the present invention is to provide relatively simple means for removing the upper stratum of relatively cold glass from the gathering area of a forehearth and for replenishing the void thus created by relatively hot glass and at the same time draining the removal means when out of the gathering area so as to prevent the return of relatively cold glass thereto.

According to the present invention a skimming head in its displacement within the molten glass is caused to travel transversely and in front of the bridge and to a depth slightly above the effective upper edge of the bridge which preferably is inclined downwardly from front to rear, the skimming head being given a change of direction of movement near the end of its stroke to cause the skimmed material to pass over the bridge.

Preferably the motion of the skimmer is in a substantially rectangular path in plan, that is to say, it is displaced in one direction parallel to the transverse bridge and with one face leading, is angularly displaced through an arc of substantially 90°, is displaced in the opposite direction but with one edge, as distinct from a face, leading and is then angularly displaced in a reverse direction through an arc of substantially 90° to bring it back to its original position.

From another aspect of the present invention a skimming head or paddle adapted for displacement with its lowermost edge within the molten glass, and with one face leading, in order to skim the molten glass, is angularly rotated about a vertical axis, and is then elevated and displaced in its own plane so as to return to its original position, the displacement of the skimming head or paddle in its own plane enabling draining of the glass charge from the skimming head before the head is again angularly rotated to reach its original position for repetition of its skimming movement.

The invention is more particularly described with reference to the accompanying drawings, in which:—

Figure 1 is a plan view of a furnace forehearth showing the bridge, the skimmer and the operating means thereof.

Figure 2 is a corresponding side sectional elevation.

Figure 3 is a corresponding front view partly in section and with the skimmer in that position in which it has just completed its skimming movement in front of the bridge, and has been rotated through 90° and elevated in order to return transversely across the forehearth and above the bridge to commence its next skimming movement.

Figure 4 is a plan view showing diagrammatically the movement of the skimmer.

Figure 5 is a front elevational view with the skimmer at the commencement of its skimming movement, the front wall of the forehearth being broken away to show the base of the skimmer, the level of the glass and the top of the bridge member.

In the construction according to the drawings, the forehearth of a furnace comprises a front wall 10, a floor 11 and side walls 12, 13. The gathering area of the forehearth, that is to say, the part of this from which charges of glass are picked up by a gathering mould or head, shown in chain dotted lines at 14 in Figure 3, is between the front wall 10 of the forehearth and the refractory bridge member 15 which is supported between the side walls 12, 13, of the forehearth in such a manner that its base 16 lies above the floor 11 of the forehearth, whilst its upper end 17 lies beneath the normal level 18 of the glass within the forehearth and is inclined downwardly from front to rear.

A cover 19 is provided for the forehearth which is cut away at 19a in the manner shown in Figure 1 to permit of descent of the gathering head or mould 14 into the gathering area and to permit of displacement of a skimming head 20 by means located above the cover. The skimmer 20 is carried by a spindle 21 which is rigidly connected with an arm 22 and is locked thereto by means of a handle 23. The arm 22 is cranked at 24 and is pivoted at 25 to an overhanging part 26 of a carriage 27 which is provided with rollers 28 adapted for engagement within grooves 29 on opposite sides of a track 30.

The track 30 is carried between end plates 31 of a hanger including a cover 32, supported by rods 33. Any appropriate means may be employed for imparting limited vertical movement to the supporting rods 33, to raise and lower the track 30 and the mechanism supported thereby. Figure 5 shows a suitable construction, wherein the rods 33 are mounted in appropriate guides 40. Each rod carries a cam roller 41 which rests upon a reciprocable cam slide 42 having raised portions 43 associated therewith. When the slide is reciprocated by any appropriate means, such as the piston 44, the rods 33 and the parts supported thereby, will be raised or lowered, in an obvious manner. On the lower face of the overhanging cover portion 32 a pair of cams 34, 34a, are rigidly mounted, these cams being spaced transversely of the cover so as to be engaged by a roller 35 carried at the free end of the cranked arm 24 from which the skimming head 20 is suspended.

The overhanging part 26 of the carriage 27 is provided with a stop 36 which limits the angular displacement of the arm 24 about its pivot 25 on said overhanging arm 26 and thus enables the arm 24 to be maintained in rigid contact with the overhanging arm 26 of the carriage 27 when the skimming head 20 is passing transversely across the gathering area and is skimming glass therefrom. The carriage 27 is provided with a driving rod 37 from any suitable source of power enabling the carriage to be displaced longitudinally of the track 30.

At the commencement of the skimming movement of the skimming head 20 the latter is in the position marked A in the diagrammatic representation according to Figure 4. In this position the driving rod 37 operates on the carriage to move this longitudinally of the track 30 and during said movement the skimming head 20 is maintained by the stop 36 in the position in which it lies at right angles to the track and to the bridge member 15, that is to say it traverses the gathering area with one face of the skimming head leading in order to skim the surface or upper stratum of relatively cold glass within the gathering area. When the skimming head reaches the position B the roller 35 of the arm 22 carrying the skimming head abuts against the cam 34 with the result that further movement of the carriage 27 causes the skimming head to take up an arcuate movement of 90° in which it passes through the positions C and D in succession and eventually reaches the position E. In this position it lies substantially above the rear edge of the bridge member 15. At or slightly before this position is reached the lifting rods 33 come into operation to raise the unit comprising the track 30, end plates 31 and cover 32. This automatically also causes raising of the skimming head 20 so that in the position shown at E in Figure 4 the skimming head lies above the surface of the glass instead of with its lower edge within the glass.

The driving rod 37 now commences a pulling action on the carriage 27 until the skimming head reaches the position F, Figure 4. During its movement between the positions E and F it will be observed that the skimming head has been displaced in its own plane, that is to say, with one edge leading. On reaching the position F the roller 35 engages with the left hand end of the concave face of the cam 34a so that on further retreating movement of the carriage said roller is caused to move along said concave face of the cam 34a and cause the skimming head successively to take up the position shown at G and H (Figure 4). Finally the skimming head reaches the position A wherein the rods 33 are lowered to lower the carriage, the track and the skimming head and to bring the latter once again into a position in which its lower edge lies within the glass in the gathering area ready for its next skimming operation.

The displacement of the skimming head, therefore, is in a closed path, the traverse of a point on the skimming head being along two parallel paths interconnected at their ends by similar arcuate paths each of which subtend an angle of 90°. As a result, during the skimming movement the upper stratum of relatively cold glass from the gathering area is taken up by the skimmer and passed over the bridge member 15 at a position adjacent the side wall 13 of the forehearth.

The void created by the skimmed upper stratum of glass is taken up by the passage of relatively hot glass from the base of the forehearth in rear of the bridge member 15 which glass passes through the channel between the base 16 of the bridge member and the floor 11 of the forehearth and thence upwardly in a vertical direction into the gathering area.

The return movement of the skimming head 20 in its own plane enables draining therefrom of any relatively cold glass which might otherwise tend to adhere thereto. If desired, however, one or more mechanical stripping elements may be disposed in the paths of the edges of the skimmer to exert a scraping operation on the faces of the skimmer as it is returning to its original position, i. e., lies above the glass so as to assist in the stripping or draining operation.

I declare that what I claim is:—

1. Apparatus for conditioning glass in a forehearth comprising a refractory bridge spaced rearwardly from the front wall of the forehearth and extending transversely thereof with its base above the forehearth floor to form a channel therebetween and with its upper end below the normal level of glass within the forehearth, a skimmer and means for transversely displacing said skimmer through said glass between said refractory bridge and the front wall of said forehearth to skim the surface of the said glass in front of said bridge and for changing the direction of movement of said skimmer near the end of its skimming stroke to cause the skimmed glass to pass over said bridge.

2. Apparatus for conditioning glass in a forehearth comprising a refractory bridge spaced rearwardly from the front wall of the forehearth and extending transversely thereof with its base above the forehearth floor to form a channel therebetween and with its upper end below the normal level of glass within the forehearth, a skimmer, means for displacing said skimmer through said glass between said refractory bridge and the front wall of said forehearth and in a direction longitudinally of said bridge to skim the surface of said glass in front of said bridge, means for changing the direction of movement of said skimmer near the end of its skimming stroke to cause the skimmed glass to pass over said bridge, and means for lifting said skimmer out of contact with said glass when said skimmed glass has passed over said bridge.

3. Apparatus for conditioning glass in a forehearth comprising a refractory bridge spaced rearwardly from the front wall of the forehearth and extending transversely thereof with its base above the forehearth floor to form a channel therebetween and with its upper end below the normal level of glass within the forehearth, a skimmer and means for transversely displacing said skimmer with one face leading through said glass between said refractory bridge and the front wall of said forehearth to skim the surface of said glass in front of said bridge, for changing the direction of movement of said skimmer near the end of its skimming stroke to cause the skimmed glass to pass over said bridge, and for returning said skimmer with one edge leading to a position adjacent the commencement of its transverse path of movement, and means for elevating said skimmer out of contact with said glass prior to said return movement.

4. Apparatus for conditioning glass in a forehearth comprising a refractory bridge spaced rearwardly from the front wall of the forehearth and extending transversely thereof with its base above the forehearth floor to form a channel therebetween and with its upper end below the normal level of glass within the forehearth and inclined downwardly from front to rear, a skimmer, means for displacing the skimmer successively in one direction parallel to the transverse bridge when its lower edge is at right angles to the bridge and lies within the glass, thence through and arc of substantially 90° thence along a return path above the bridge member and finally through an arcuate path to take up its original position and means for raising and lowering the skimmer respectively at the end of its first and second arcuate paths.

5. Apparatus for conditioning glass in a forehearth comprising a refractory bridge spaced rearwardly from the front wall of the forehearth and extending transversely thereof with its base above the forehearth floor to form a channel therebetween and with its upper end below the normal level of glass within the forehearth and inclined downwardly from front to rear, a skimmer, means for transversely displacing said skimmer through said glass between said refractory bridge and the front wall of said forehearth to skim the surface of said glass in front of said bridge and for returning said skimmer when out of contact with said glass, means for lifting and lowering said skimmer at the end of its skimming and return strokes respectively, and cam means for angularly displacing said skimmer at the end of its skimming and return strokes through 90° to permit the skimmer to move transversely in one direction with one face leading during skimming and to return with one edge leading when out of contact with the glass.

6. In combination, a forehearth having a gathering area, a bridge between opposite walls of said forehearth to constitute one end of said gathering area, said bridge lying below the normal level of glass in said forehearth and above the floor thereof, a skimmer, means for moving said skimmer in a closed path over a part of which it travels with one face leading and within the glass in said gathering area, and over another part of which it moves out of said area and above the glass and with one edge leading and means for raising and lowering said skimmer at predetermined points in its movement in a closed path.

7. In combination, a forehearth having a gathering area, a bridge between opposite walls of said forehearth to constitute one end of said gathering area, said bridge lying below the normal level of glass in said forehearth and above the floor thereof, a skimmer, means for moving said skimmer in a closed path partly within said forehearth and partly outside the same, with a point on said skimmer moving along two parallel paths, the ends of which are interconnected by similar arcs of substantially 90°, and means for raising and lowering said skimmer respectively at predetermined points in its movement in said arcuate paths in order to skim the surface of glass in said gathering area and to remove said surface on to the opposite side of said bridge, whereupon the void created in said gathering area is taken up by relatively hot glass moving beneath said bridge and vertically into said gathering area.

8. In combination, a forehearth having a forwardly disposed gathering area, a bridge extending across the forehearth rearwardly of said area with its upper end downwardly inclined from front to rear and lying wholly beneath the normal level of glass in said forehearth and with its base above the floor of said forehearth, a skimmer, an arm carrying said skimmer, a carriage to which said arm is pivotally connected, a transverse track along which said carriage is displaceable, stationary cams associated with said track and a roller carried by the free end of said arm for engagement by said cams at the ends of displacement of said carriage along said track.

THOMAS FINNEY PEARSON.